United States Patent [19]

Dove et al.

[11] Patent Number: 5,076,529
[45] Date of Patent: Dec. 31, 1991

[54] SEAT ADJUSTER WITH IMPROVED CRASH RESISTANCE

[75] Inventors: Allen D. Dove, Roscoe; Ronald E. Ethington; Jack R. Tappainer, both of Rockford, all of Ill.

[73] Assignee: Atwood Industries, Inc., Rockford, Ill.

[21] Appl. No.: 647,278

[22] Filed: Jan. 29, 1991

[51] Int. Cl.⁵ ............................................. F16M 13/00
[52] U.S. Cl. ................................... 248/429; 248/900; 296/65.1
[58] Field of Search ............... 248/429, 430, 424, 900, 248/909, 420; 296/65.1; 297/341, 340, 344

[56] References Cited

U.S. PATENT DOCUMENTS

| | | | |
|---|---|---|---|
| 3,258,240 | 6/1966 | Kirk | 248/429 X |
| 4,635,890 | 1/1987 | Matsuda et al. | 248/429 |
| 4,639,038 | 1/1987 | Heling | 297/341 |
| 4,781,354 | 11/1988 | Nihei et al. | 248/429 |
| 4,909,469 | 3/1990 | Nihei et al. | 248/429 |
| 4,958,799 | 9/1990 | Clauw et al. | 248/430 |

*Primary Examiner*—Ramon O. Ramirez
*Attorney, Agent, or Firm*—Leydig, Voit & Mayer, Ltd.

[57] ABSTRACT

The latch of a seat adjuster is pivotally mounted on a latch mounting bracket which, in turn, is secured rigidly to the upper track of the seat adjuster. The latch mounting bracket is formed with a weakened area in proximity to the pivot for the latch. In the event of a frontal crash, the weakened area deforms to enable the mounting bracket to move forwardly relative to the latch and clamp the latch in its latched position, thereby preventing the latch from pivoting to its unlatched position. A second bracket underlies the latch mounting bracket and coacts with the other latching elements to force the latching tooth of the latch to fail in shear rather than by bending. An anchor for a seat belt may be carried by the second bracket.

11 Claims, 4 Drawing Sheets

SEAT ADJUSTER WITH IMPROVED CRASH RESISTANCE

BACKGROUND OF THE INVENTION

This invention relates to a seat adjuster or track assembly for supporting a vehicle seat for selective back and forth adjustment in the passenger compartment of the vehicle.

Typically, the front seat of the vehicle is supported by two adjustable track assemblies, there being one track assembly beneath the seat along each side thereof. Each assembly comprises an upper track secured to the lower side of the seat and supported on a lower track to move back and forth in the passenger compartment. The lower track is anchored to the floor pan of the vehicle.

In the seat adjuster of the invention, a latch plate is fixed to and extends along the lower track of each assembly and is formed with a series of longitudinally spaced latching windows. A latch is pivotally supported on a mounting bracket on the upper track and includes at least one latching tooth which normally projects into one of the latching windows to lock the upper track against movement relative to the lower track. When the latch is pivoted on the mounting bracket to an unlatched position, the latching tooth is retracted out of the window to permit adjustment of the upper track and the seat carried thereby. In some cases, the latch may be formed with multiple longitudinally spaced latching teeth which extend into a plurality of adjacent latching windows.

In modern seat adjusters, a seat belt anchor is attached to the upper track, usually by means of a bracket, and serves as an anchor point for the fixed strap of a seat belt. As a result of anchoring the fixed strap of the seat belt to the upper track, the seat belt adjusts back and forth with the seat so as to increase the comfort of the passenger. When a frontal crash occurs, however, the load imposed by the passenger against the seat belt is transmitted to the upper track. Thus, the track assembly must be capable of sustaining heavier loads than is the case where the seat belt is anchored to a structure other than the track assembly.

During a frontal impact, the upper track of the assembly tends to move forward relative to the lower track. Such movement tends to cam the latch to its unlatched position. If the latch releases, the upper track becomes unrestrained against forward movement and increases the chances of passenger injury.

SUMMARY OF THE INVENTION

The general aim of the present invention is to provide a new and improved seat adjuster in which the latch is uniquely clamped in its latched position under an impact condition and is positively held against being pivoted to its unlatched position by the forces resulting from the impact.

A more detailed object of the invention is to achieve the foregoing by providing a novel latch mounting bracket which is capable of moving forwardly relative to the latch under impact conditions and which, upon moving forwardly, clamps the latching tooth against the latching window in order to prevent the latch from pivoting to its unlatched position.

Still a more detailed object is to enable forward movement of the latch mounting bracket relative to the latch by creating in the mounting bracket a weakened area which deforms and allows the bracket to move forwardly when subjected to severe impact loads.

The invention also resides in the novel coaction of a seat belt bracket with the latch mounting bracket and the latching window to place the latching tooth under shear forces rather than bending forces when a crash occurs.

These and other objects and advantages of the invention will become more apparent from the following detailed description when taken in conjunction with the accompanying drawings.

DETAILED DESCRIPTION OF THE PREFERRED EMBODIMENT

Figure 1:
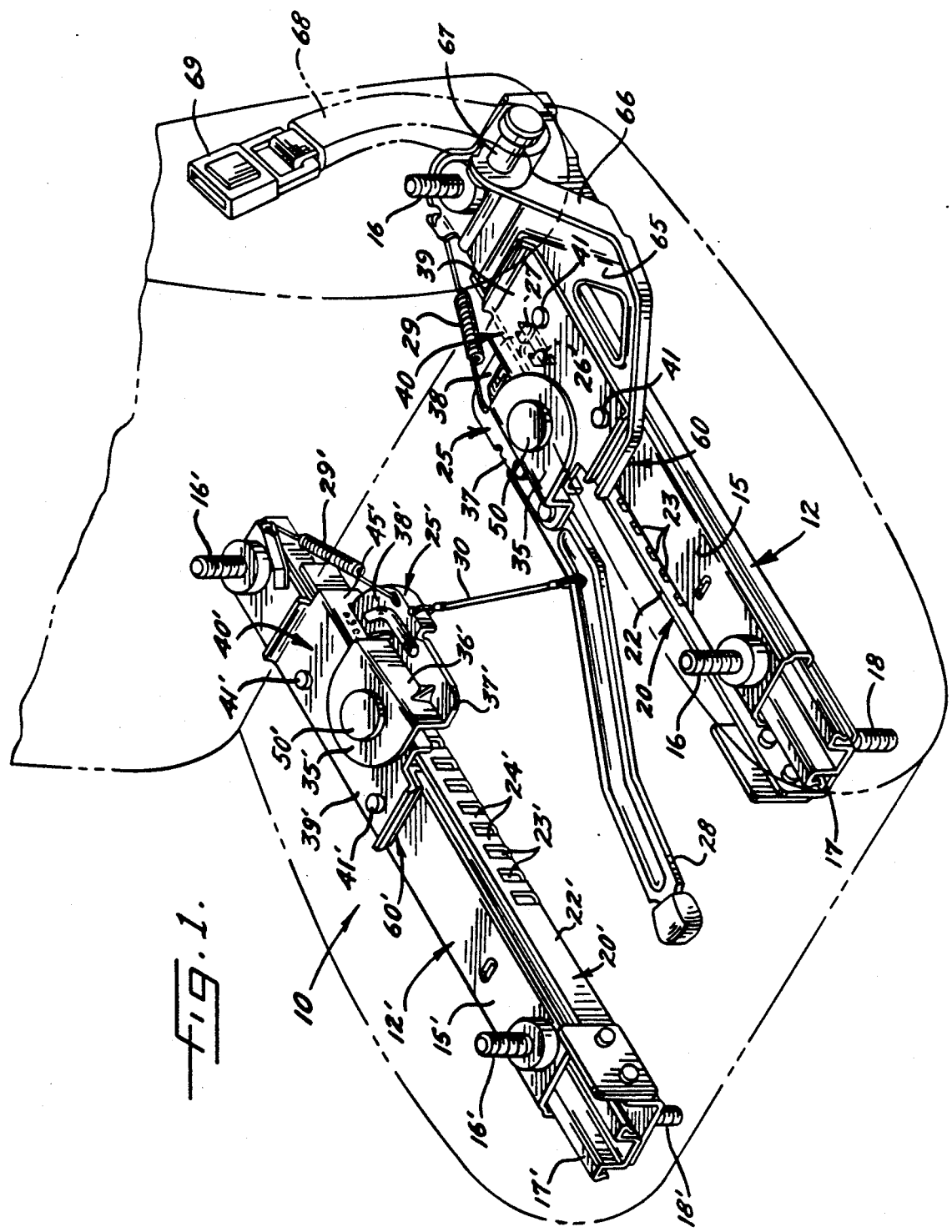
FIG. 1 is a fragmentary perspective view showing a vehicle seat equipped with new and improved seat adjusting track assemblies incorporating the unique features of the present invention.

For purposes of illustration, the invention has been shown in the drawings as embodied in means for mounting a vehicle seat 10 on the floor pan 11 (FIG. 3) of the vehicle and enabling selective back and forth adjustment of the seat. The mounting means comprise two longitudinally extending track assemblies 12 and 12' located beneath and along the two sides of the seat. In this instance, the passenger side seat has been shown and thus the track assembly 12 is an inside assembly while the track assembly 12' is an outside assembly. The two assemblies are closely similar but are not identical. Components of the outside assembly 12' that are similar or generally similar to components of the inside assembly 12 have been indicated by the same but primed reference numerals.

Each track assembly 12, 12' comprises a longitudinally extending upper track 15, 15' whose forward and rear end portions are anchored to the seat 10 by studs 16, 16' or other suitable fastening means. The upper track is supported to roll back and forth along a longitudinally extending lower track 17, 17' which is fastened to the floor pan 11 by studs 18, 18'. Antifriction friction units 19, 19' (FIGS. 3 to 5) are interposed between the upper and lower tracks and support the upper track to roll on the lower track.

An elongated latching member 20, 20' (FIGS. 3 to 5) extends along the inboard side of the lower track 17, 17' of each assembly 12, 12'. Each latching member is generally L-shaped in cross-section and includes a horizontal plate 21, 21' underlying the lower track and fixed rigidly thereto. Formed integrally with and extending vertically from the horizontal plate is a latching plate 22, 22' which is spaced laterally from the inboard side of the lower track. Several longitudinally spaced and laterally facing latching windows 23, 23' are formed through the latching plate 22, 22'. The latching windows are rectangular and are separated from one another by vertically extending webs 24, 24'.

A latch 25, 25' is carried by and is supported to pivot relative to the upper track 15, 15' of each assembly 12, 12'. The latch includes at least one latching tooth and, in this particular instance, the latch includes a forward latching tooth 26, 26' (FIGS. 5 and 7) and a longitudinally spaced rear latching tooth 27, 27'. When the latch is in its latched position as shown in FIG. 7, the two teeth project through a pair of adjacent windows 23, 23' in the latch plate 22, 22' and lock the upper track 15, 15' against longitudinal movement relative to the lower track 17, 17'. When the latch is pivoted to an unlatched position as shown in phantom lines in FIG. 2, the teeth are retracted from the windows and permit longitudinal adjustment of the upper track and the seat 10 carried thereby.

Figure 2:
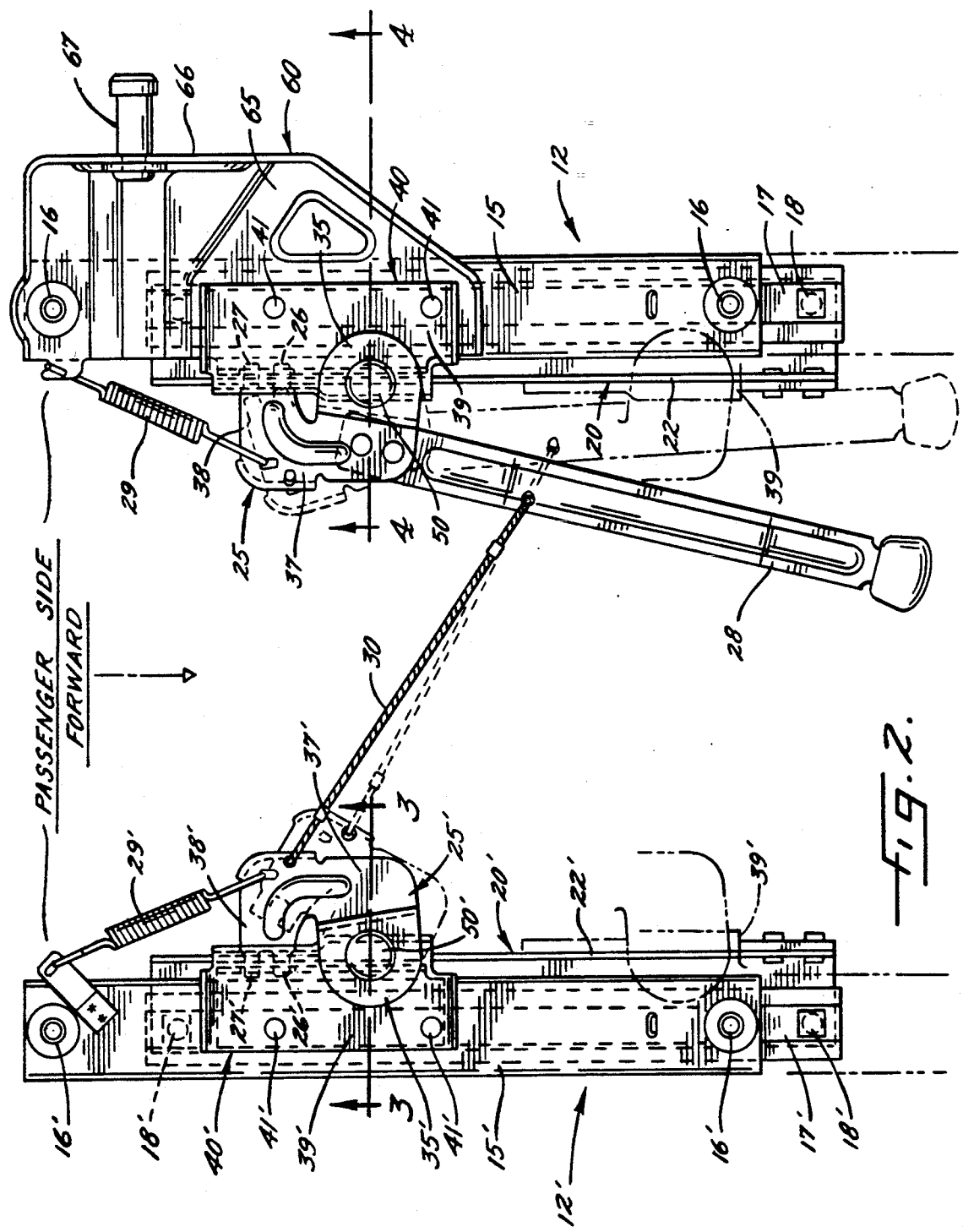
FIG. 2 is an enlarged top plan view of the track assemblies shown in FIG. 1.

As shown in FIGS. 1 and 2, an elongated handle 28 is secured to and projects forwardly from the latch 25 and may be swung in a counterclockwise direction to pivot the latch to its unlatched position. When the handle is released, a contractile spring 29 returns the latch to its normally latched position, the spring is stretched between the latch and the upper track 15. Actuation of the latch 25' is effected by a cable 30 which is connected between the handle 28 and the latch 25' and which serves to pivot the latch 25' to its unlatched position when the handle is swung counterclockwise. A contractile spring 29' is connected between the latch 25' and the upper track 15' and restores the latch to its latched position when the handle is released.

If the vehicle should happen to be involved in a frontal crash, the upper tracks 15, 15' tend to move forwardly relative to the lower tracks 17, 17'. Such movement tends to cause the webs 24, 24' of the windows 23, 23' in the latching plates 22, 22' to cam against the forward edges of the rear teeth 27, 27' of the latches 25, 25' and to cause the latches to pivot to their unlatched positions. If the latches release during a crash, forward movement of the seat 10 is unrestrained and thus the passenger is more likely to incur a serious injury.

In accordance with the present invention, the latches 25, 25' are automatically clamped in their latched positions when the track assemblies 12, 12' are subjected to severe longitudinal forces such as those which would be encountered during a violent frontal crash. Being clamped in their latched positions, the latches are less likely to release and thus are better able to prevent forward movement of the seat 10 during an accident.

More specifically, each latch 25, 25' formed with a horizontal mounting plate 35, 35' by which the latch is pivotally supported. Formed integrally with and depending from the inboard margin of the mounting plate is a vertical flange 36, 36' (FIGS. 3 to 5) whose lower margin is integral with a generally L-shaped arm 37, 37'. The latching teeth 25, 26' and 27, 27' are formed on the free end of a laterally projecting section 38, 38' of the arm.

The mounting plate 35, 35' of each latch 25, 25' overlies a generally horizontal plate 39, 39' (FIGS. 3 to 5) which forms part of an upper bracket 40, 40' for mounting the latch. The bracket 40, 40' is secured rigidly to the upper track 15, 15' by rivets 41, 41' which extend through holes 42, 42' (FIGS. 6) in the plate 39, 39'.

Formed integrally with and depending from the inboard margin of the plate 39, 39' of each mounting bracket 40, 40' is a flange 45, 45' (FIGS. 3 to 5) which extends downwardly alongside the inboard face of the latch plate 22, 22'. A laterally facing and longitudinally elongated slot 46, 46' (FIGS. 5 and 7) is formed through the flange 45, 45' and is sufficiently long to receive the latching teeth 26, 26' and 27, 27' and the end portion of the laterally projecting section 38, 38' of the latch arm 37, 37'. The teeth extend through the slot 46, 46' in order to enter the windows 23, 23' of the latch plate 22, 22' (see FIG. 7).

Figure 3:
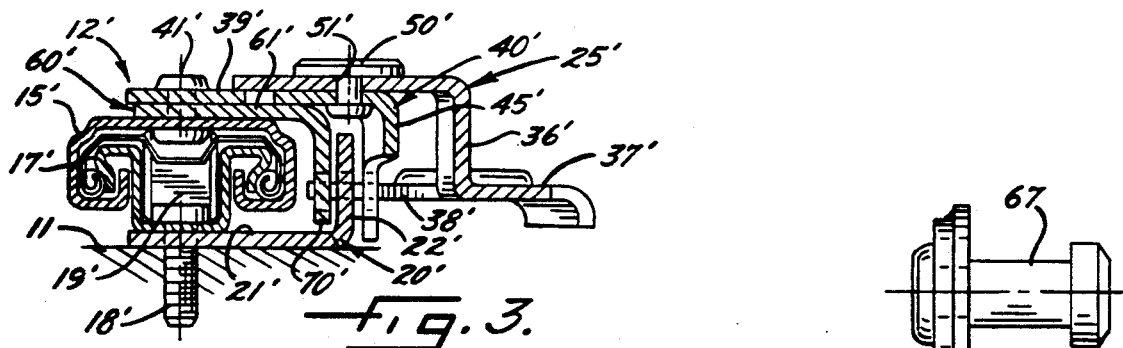
FIGS. 3 and 4 are enlarged cross-sections taken substantially along the lines 3—3 and 4—4, respectively, of FIG. 2.
Figure 4:
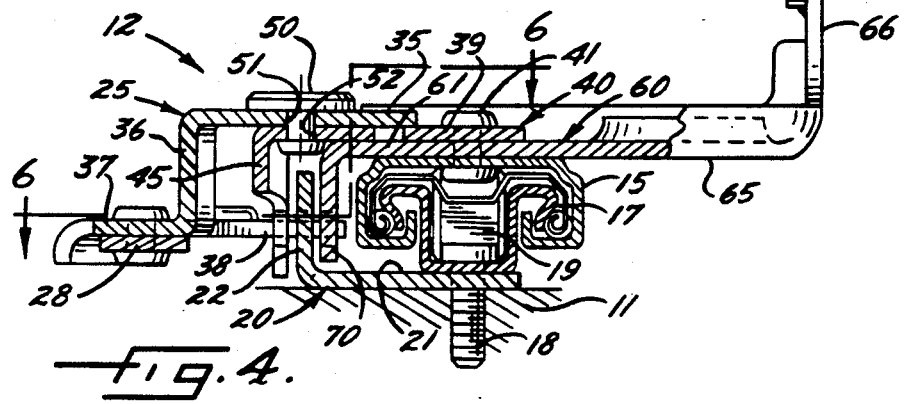
Figure 5:
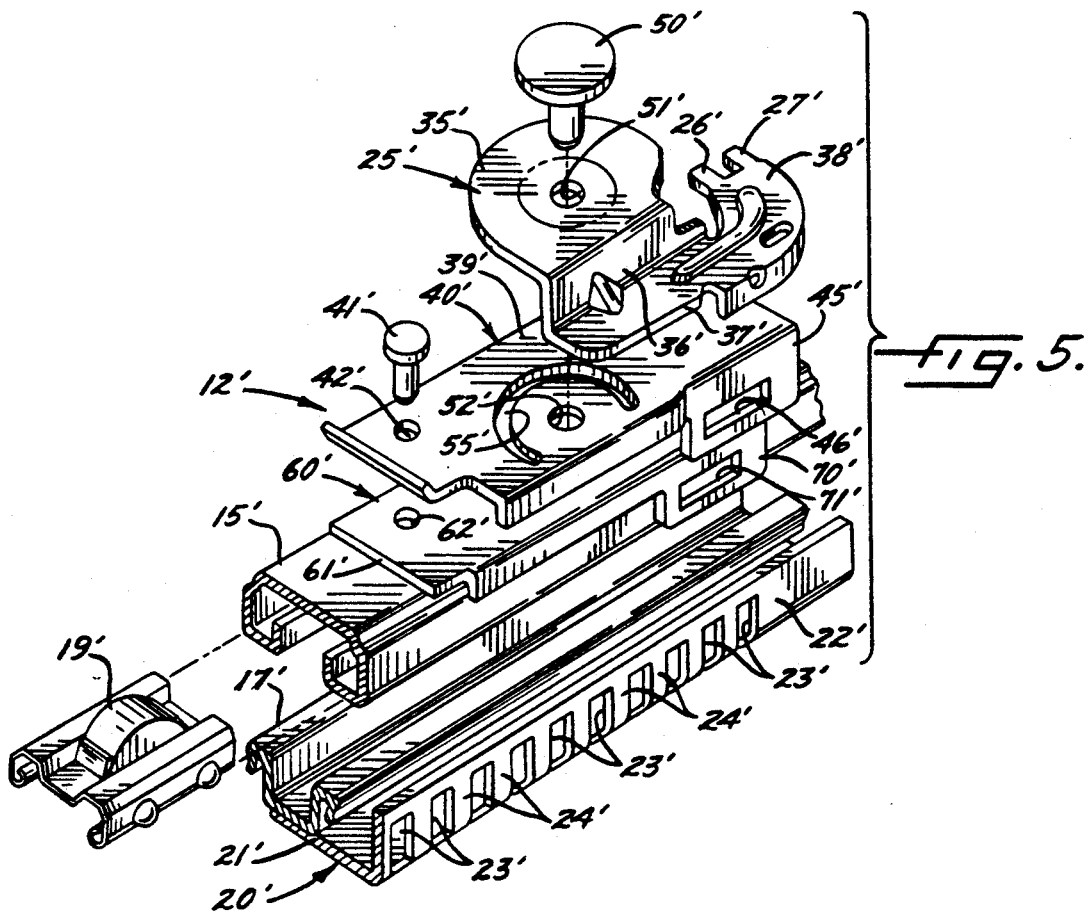
FIG. 5 is an exploded perspective view of a portion of one of the track assemblies.
Figures 6, 7:
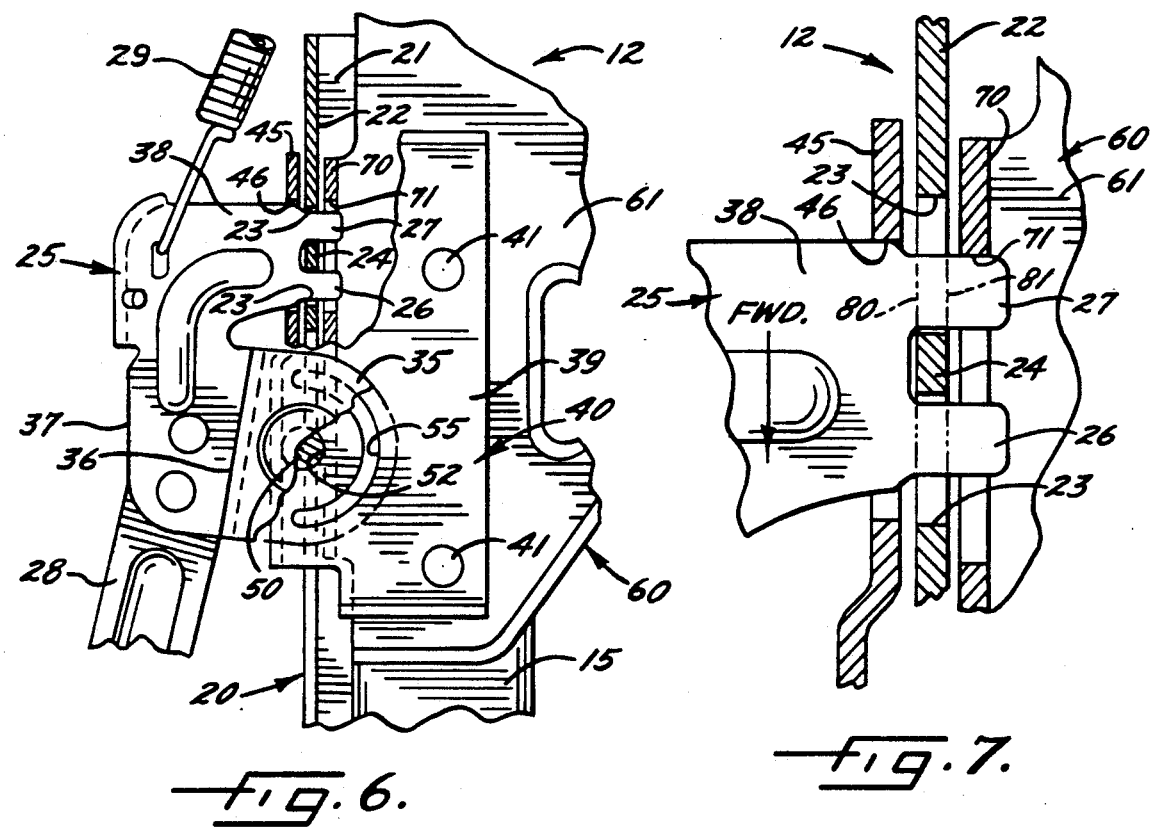
FIG. 6 is a fragmentary top plan view as seen substantially along the line 6—6 of FIG. 4, certain parts being broken away and shown in section.
FIG. 7 is an enlarged fragmentary view of a portion of the latch illustrated in FIG. 6 and shows the latch clamped in its latched position under a crash condition.

As shown most clearly in FIGS. 3 to 5, the latch 25, 25' is pivotally supported on the latch mounting bracket 40, 40' by a rivet 50, 50'. The rivet includes a head overlying the plate 35, 35' of the latch, a shank extending snugly but pivotally through a hole 51, 51' in the plate 35, 35' and a hole 52, 52' in the bracket plate 39, 39', and a swaged lower end portion which captivates the rivet axially. Thus, the rivet mounts the latch 25, 25' for swinging about a vertical axis and between its latched and unlatched positions on the latch mounting bracket 40, 40'.

Pursuant to the invention, a weakened area 55, 55' (FIGS. 5 and 6) is formed in the plate 39, 39' of each latch mounting bracket 40, 40' in proximity to the hole 52, 52' for the rivet 50, 50'. If the vehicle is involved in a frontal crash, the weakened area 55, 55' yields and allows the latch mounting bracket to move forwardly through a slight distance and to clamp the latch 25, 25' in the latch plate 22, 22'.

In this specific instance, the weakened area 55, 55' in the plate 39, 39' of each latch mounting bracket 40, 40' is defined by a generally C-shaped slot which is formed vertically through the plate. As shown in FIG. 5, the C-shaped slot 55, 55' is concentric with and is spaced radially from the hole 52, 52' for the rivet 50, 50'. The slot extends through slightly more than 180 degrees and is oriented with the open side of the C facing laterally in the inboard direction.

The advantage provided by the C-shaped slot 55, 55' is most apparent from a comparison of FIGS. 6 and 7 which show the inside track assembly 12. Under normal conditions, the latching teeth 26 and 27 project through the slot 46 in the flange 45 of the latch mounting bracket 40 and extend through two adjacent windows 23 in the latch plate 22. The two teeth straddle the web 24 between such windows and are received in the windows with a small amount (e.g., one millimeter) of longitudinal clearance in order to enable the teeth to enter into and retract from the windows when the latch 25 is pivoted between its latched and unlatched positions. Under normal conditions, the free end portion of the laterally extending section 38 of the latch arm 37 also extends into the slot 46 in the flange 45 with a small amount of longitudinal clearance.

In the event of a frontal crash, the upper track 15 moves forwardly relative to the lower track 17 and carries the latch 25 and the latch mounting bracket 40 forwardly relative to the lower track. This causes the forward edge of the tooth 27 to engage the rear edge of the intervening web 24 (see FIGS. 6 and 7) and, without a weakened area such as the C-shaped slot 55, such engagement might cam the latch 25 to its unlatched position and leave the seat 10 unrestrained. In the present assembly 12, however, the weakened area of the C-shaped slot 55 allows the metal of the bracket plate 39 adjacent the slot to be deformed by the forward force and to tend to close up the slot. The resulting deformation of the plate 39 allows the latch mounting bracket 40 to move forwardly through a short distance relative to the latch 25. Such movement brings the forward edge of the slot 46 in the flange 45 into engagement with the rear edge of the arm section 38 as shown in FIG. 7 so as to pinch the forward edge of the tooth 27 against the rear edge of the web 24. As a result, the latch becomes clamped between the flange 45 and the web 24 and is positively prevented from pivoting to its unlatched position.

Advantageously, a second bracket 60, 60' (FIGS. 3 to 5) is interposed between each upper track 15, 15' and the overlying latch mounting bracket 40, 40'. Herein, each bracket 60, 60' includes a horizontal plate 61, 61' sandwiched between the upper side of the upper track and the plate 39, 39' of the latch mounting bracket 40, 40'. The rivets 41, 41' extend through holes 62, 62' in the plate 61, 61' to secure the bracket 60, 60' to the upper track.

The brackets 60 and 60' are identical to one another except that an integral extension 65 (FIG. 4) projects laterally from the outboard margin of the bracket 60, there being a vertical leg 66 projecting upwardly from the extension. A horizontal pin 67 extends from the leg 66 and serves as an anchor for the fixed or stationary belt 68 (FIG. 1) of a safety belt system. The belt carries a socket 69 on its upper end for receiving a tongue (not shown) on the extendible/retractable belt of the safety belt system. With this arrangement, the stationary belt 68 adjusts forwardly and rearwardly in unison with the seat 10 to avoid the need of the passenger adjusting the length of the extendible/retractable belt when the seat is adjusted. Because the belt 68 is anchored to the track assembly 12, however, additional load is imposed on the track assembly via the belt and the bracket 60 when the vehicle is involved in a frontal crash, such load causing the upper track 15 to move forwardly relative to the lower track 17. The force imposed by the passenger on the seat belt also is transmitted to the track assembly 12' via the frame structure of the seat 10. Thus, utilization of the track assembly 12 as an anchor for the belt 68 requires that both track assemblies be capable of sustaining heavier loads than is the case when the belt is anchored to a stationary part of the vehicle.

Reverting now to the specific structure of the brackets 60, 60', a flange 70, 70' (FIGS. 3 to 7) is formed integrally with and depends from the inboard margin of the plate 61, 61' of each bracket. The flange extends downwardly alongside the outboard face of the latch plate 22, 22' and is formed with a laterally facing and longitudinally elongated slot 71, 71' which has approximately the same size and shape as the slot 46, 46' and which is in registry with the slot 46, 46'. When the latch 25, 25' is in its latched position, its teeth 26, 26' and 27, 27' project through the slot 71, 71' as shown in FIG. 6. Normally, there is longitudinal clearance between the teeth and the front and rear edges of the slot 71, 71' in order to enable the teeth to pivot into and out of the slot.

FIGS. 6 and 7 demonstrate the advantages gained by the foregoing. As shown in FIG. 6 and as stated above, there normally is longitudinal clearance between the teeth 26 and 27 and the edges of the slot 71 in the flange 70 of the bracket 60. When a frontal impact occurs and the upper track 15 moves forwardly, the bracket 60 also moves forwardly. This brings the rear edge of the slot 71 in the flange 70 into pressing engagement with the rear edge of the tooth 27 as shown in FIG. 7. As a result, the tooth 27 is prevented from bending but instead is forced to fail in shear along either one of two shear lines 80 or 81. The tooth is less likely to fail in shear than by bending and, by forcing the tooth to fail in shear, the chances of a failure actually occurring are significantly reduced.

We claim:

1. A track assembly for supporting the seat of a vehicle on the floor pan thereof, said assembly comprising an upper track adapted to be secured to the seat, a lower track adapted to be secured to the floor pan, means supporting said upper track on said lower track for adjustment of said upper track forwardly and rearwardly of the vehicle, means rigid with said lower track and defining a series of longitudinally spaced latching windows, a bracket secured to said upper track and having a flange located alongside said windows, a slot formed in said flange and having front and rear edges, a latch having at least one latching tooth, said latch normally being disposed in a latched position in which said tooth projects through said slot and one of said windows to prevent adjustment of said upper track relative to said lower track, means pivotally mounting said latch on said bracket for swinging to an unlatched position in which said tooth is retracted out of said slot and said one window to permit adjustment of said upper track relative to said lower track, said mounting means comprising a pin extending through said latch and said bracket, a hole in said bracket and snugly receiving said pin, and a weakened area in said bracket in proximity to and in spaced relation with said hole, said weakened area permitting said bracket to deform when subjected to a severe forward force and to move forwardly and place the rear edge of said slot in said flange in engagement with said latch thereby to prevent said latch from swinging to said unlatched position.

2. A track assembly as defined in claim 1 in which said weakened area is defined by a slot formed through said bracket.

3. A track assembly as defined in claim 2 in which said slot in said bracket is generally C-shaped and is generally concentric with the hole in said bracket.

4. A track assembly as defined in claim 3 in which the open side of the C defined by said C-shaped slot faces laterally toward said flange.

5. A track assembly as defined in claim 1 further including a second bracket sandwiched between said one bracket and said upper track and secured to said upper track, said second bracket having a flange with a slot therethrough, the flanges of said brackets being located, on laterally opposite sides of said windows, said latching tooth extending into the slot in the flange of said second bracket when said latch is in said latched position.

6. A track assembly as defined in claim 5 further including seat belt anchoring means on said second bracket.

7. A track assembly for supporting the seat of a vehicle on the floor pan thereof, said assembly comprising an upper track adapted to be secured to the seat, a lower track adapted to be secured to the floor pan, means supporting said upper track on said lower track for adjustment of said upper track forwardly and rearwardly of the vehicle, means rigid with said lower track and defining a series of longitudinally spaced and laterally facing latching windows, a lower bracket secured to the upper side of said upper track and having a seat belt anchor attached thereto, an upper bracket secured to the upper side of said lower bracket and having a flange located alongside said windows, a laterally facing slot formed in said flange and having front and rear edges, a latch having at least one latching tooth, said latch normally being disposed in a latched position in which said tooth projects through said slot and one of said windows to prevent adjustment of said upper track relative to said lower track, means pivotally mounting said latch on the upper side of said upper bracket for swinging to an unlatched position in which said tooth is retracted out of said slot and said one window to permit adjustment of said upper track relative to said lower track, said mounting means comprising a pin extending through said latch and said upper bracket, a hole in said upper bracket and snugly receiving said pin, and a weakened area in said upper bracket in proximity to and in spaced relation with said hole, said weakened area permitting said upper bracket to deform when subjected to a severe forward force and to move forwardly and place the rear edge of said slot in said flange in engagement with said latch thereby to prevent said latch from swinging to said unlatched position.

8. A track assembly as defined in claim 7 in which said lower bracket includes a flange with a laterally facing slot formed therethrough, the flanges of said brackets being located on laterally opposite sides of said windows, said latching tooth extending into the slot in the flange of said lower bracket when said latch is in said latched position.

9. A track assembly for supporting the seat of a vehicle on the floor pan thereof, said assembly comprising an upper track adapted to be secured to the seat, a lower track adapted to be secured to the floor pan, means supporting said upper track on said lower track for adjustment of said upper track forwardly and rearwardly of the vehicle, an upright plate fixed to and extending along said lower track in laterally spaced relation therewith and having a series of longitudinally spaced and laterally facing latching windows, said plate having inboard and outboard sides, a lower bracket secured to the upper side of said upper track and having a first flange located along the outboard side of said plate, a slot formed in said first flange, a seat belt anchor attached to said lower bracket, an upper bracket secured to the upper side of said lower bracket and having a second flange located along the inboard side of said plate, a slot formed in the flange of said second bracket and having front and rear edges, a latch having a pair of longitudinally spaced and laterally extending latching teeth, said latch normally being disposed in a latched position in which said teeth project laterally through the slot in said second flange, through a pair of adjacent windows in said plate, and into the slot in said first flange, means pivotally mounting said latch for swinging to an unlatched position in which said teeth are retracted out of said slots and said windows, said means comprising a pin extending through said latch and said upper bracket, a hole in said upper bracket and snugly receiving said pin, and a weakened area in said upper bracket in proximity to and in spaced relation with said hole, said weakened area permitting said upper bracket to deform when subjected to a severe forward force and to move forwardly relative to said latch and place the rear edge of the slot in said second flange in engagement with said latch thereby to prevent said latch from pivoting to said unlatched position.

10. A track assembly as defined in claim 9 in which said weakened area is defined by a generally C-shaped slot formed through said upper bracket, said C-shaped slot being substantially concentric with the hole in said upper bracket.

11. A track assembly for supporting the seat of a vehicle on the floor pan thereof, said assembly comprising an upper track adapted to be secured to the seat, a lower track adapted to be secured to the floor pan, means supporting said upper track on said lower track for adjustment of said upper track forwardly and rearwardly of the vehicle, an upright plate fixed to and extending along said lower track in laterally spaced relation therewith and having a series of longitudinally spaced and laterally facing latching windows, said plate having inboard and outboard sides, a lower bracket secured to the upper side of said upper track and having a first flange located along the outboard side of said plate, a slot formed in said first flange, a seat belt anchor attached to said lower bracket, an upper bracket secured to the upper side of said lower bracket and having a second flange located along the inboard side of said plate, a slot formed in the flange of said second bracket and having front and rear edges, a latch having a pair of longitudinally spaced and laterally extending latching teeth, said latch normally being disposed in a latched position in which said teeth project lateraly through the slot in said second flange, through a pair of adjacent windows in said plate, and into the slot in said first flange, and means pivotally mounting said latch for swinging to an unlatched position in which said teeth are retracted out of said slots and said windows.

* * * * *